United States Patent
Osakabe et al.

(10) Patent No.: US 6,813,659 B1
(45) Date of Patent: Nov. 2, 2004

(54) DATA TRANSMISSION CONTROL APPARATUS AND DATA TRANSMISSION METHOD

(75) Inventors: Yoshio Osakabe, Kanagawa (JP); Harumi Kawamura, Tokyo (JP); Yoshiyuki Takaku, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/420,055

(22) Filed: Oct. 18, 1999

(30) Foreign Application Priority Data

Oct. 19, 1998 (JP) .......................................... 10-297252

(51) Int. Cl.[7] .............................................. G06F 13/12
(52) U.S. Cl. .............................. 710/62; 710/72; 710/73; 340/815.6
(58) Field of Search .............................. 710/62, 63, 72, 710/73; 340/815.6

(56) References Cited

U.S. PATENT DOCUMENTS

| | | | | |
|---|---|---|---|---|
| 5,748,254 A | * | 5/1998 | Harrison et al. | 348/552 |
| 5,764,761 A | * | 6/1998 | Vicard | 713/189 |
| 5,941,963 A | * | 8/1999 | Charles et al. | 710/62 |
| 6,122,572 A | * | 9/2000 | Yavnai | 701/23 |
| 6,295,633 B1 | * | 9/2001 | Murakawa | 716/8 |
| 6,430,358 B1 | * | 8/2002 | Yuen et al. | 386/83 |

* cited by examiner

*Primary Examiner*—Jeffrey Gaffin
*Assistant Examiner*—Alan S Chen
(74) *Attorney, Agent, or Firm*—Frommer Lawrence & Haug LLp; William S. Frommer; Samuel S. Lee

(57) ABSTRACT

A data transmission system in which a function block is housed in a subunit in a unit to enable communication among the unit, subunit and the function block. To this end, the data transmission system includes a digital STB 60, a DTV 70, and an audio amplifier 80. Within the DTV 70 is housed a video monitor subunit 71 within which are housed a decoder function block 72 and a feature function block 73. Within the audio amplifier 80 is housed an audio sub-unit 81 within which a decoder function block 82 and a feature function block 83, that can be endowed with functions in common with the decoder function block 72 and the feature function block 73, respectively, and a processing function block 83, are housed.

16 Claims, 19 Drawing Sheets

| OFFSET | NAME | OPERATION |
|---|---|---|
| 000h | STATE_CLEAR | STATUS AND CONTROL INFORMATION |
| 004h | STATE_SET | SETS STATE CLEAR BIT |
| 008h | NODE_IDs | INDICATES 16 BIT NODE ID |
| 00Ch | RESET_START | START COMMAND RESET |
| 018h-01Ch | SPLIT_TIMEOUT | PRESCRIBES MAXIMUM SPLIT TIME |
| 200h | CYCLE_TIME | CYCLE TIME |
| 210h | BUSY_TIMEOUT | PRESCRIBES RETRY LIMITATION |
| 21Ch | BUS_MANAGER | INDICATES BUS MANAGER |
| 220h | BANDWIDTH_AVAILABLE | INDICATES AREA ALLOCATABLE TO AISOCHRONOUS COMMUNICATION |
| 224h-228h | CHANNELS_AVAILABLE | INDICATES USE STATE OF EACH CHANNEL |

FIG.8

| opcode | function block command |
|---|---|
| operand [0] | function_block_type |
| operand [1] | function_block_ID |
| operand [2] | subcommand |
| operand [3] | suboperand [1] |
| ⋮ | ⋮ |
| operand [n] | suboperand [n-2] |

FIG.17

DATA TRANSMISSION CONTROL APPARATUS AND DATA TRANSMISSION METHOD

BACKGROUND OF THE INVENTION

1. Field of the Invention

This invention relates to a data transmission control apparatus and data transmission method applicable to a system which performs reciprocal device control, reciprocal report of statuses representing device states, and data exchange. More particularly, it relates to a data transmission control apparatus and a data transmission method which perform communication between units, subunits and functional blocks, which are physical entities furnishing real functions of the devices.

2. Description of the Related Art

Recently, control of electronic equipments installed in homes has been in common use. For example, a data transmission system, in which a television receiver (TV) 202 or a video tape recorder (VTR) 204 is manually controlled from a remote place by infra-red remote controlling commanders (IR remote controlling commanders) 201, 203, as shown in FIGS. 1A and 1B.

Also, such a data transmission system may be constructed in which a control signal transmitted from an IR remote controlling commander 211 is received by a TV 212 and is further transmitted via a cable to a VTR 213 or to an audio device 214 via wired remote controllers 215, 216, as shown in FIG. 2.

In such data transmission system, the IR remote controlling commanders 201, 203, 211 or wired remote controllers 215, 216 are sending coded control signals (control code signals), responsible for station selection by a tuner, not shown, luminance adjustment of a monitor unit, not shown, or sound volume adjustment of an audio unit, not shown, to e.g., TVs 202, 212. The control code signals are separated into category codes, specifying each device itself, such as TVs 202, 212 or audio amplifiers, not shown, or units as portions furnishing actual functions of each device, and control codes, such as volume UP/DOWN, for adjusting the sound volume of an audio unit, not shown.

Meanwhile, the conventional data transmission system, employing the above-described IR remote controlling commanders 201, 203, 211 or wired remote controllers 213, 216, suffers from the following problems.

First, in the conventional data transmission system, IR remote control commanders are required depending on device types, as shown in FIGS. 1A and 1B. Thus, a number of IR remote control commanders equal to the number of the devices needs to be provided, thus detracting from facility in using the devices.

Moreover, if, in the conventional data transmission systems, there exist plural devices of the same type, it is a frequent occurrence that a control signal transmitted from a sole IR remote control commander actuates the plural devices of the same type in their entirety. That is, if, in the conventional data transmission system, plural devices of the same type co-exist, the respective devices cannot be actuated separately.

Also, in the conventional data transmission system, if the plural devices are connected using wired remote controllers, there is a placed a certain limitation on the connection sequence of the plural devices.

In addition, in the conventional data transmission system, since the IR remote controlling commanders or wired remote controllers are capable of only unidirectional communication, it is not possible to report the status of each device to the IR remote controlling commanders or wired remote controllers, such that the user is not able to comprehend the status of each device.

Also, in the conventional data transmission system, the IR remote control commander and the wired remote controller suffer from the following inconveniences.

That is, the conventional data transmission system suffers from the problem UL that, as the type of the device is increased, the number of category codes falls short. On the other hand, plural devices of the same type cannot be discriminated by the remote control code, such that, if there exist plural devices of the same type, the respective devices cannot be actuated separately. Moreover, it is not possible to cope with complicated control.

SUMMARY OF THE INVENTION

It is therefore an object of the present invention to provide a data transmission control device and a data transmission control method which overcomes the problem inherent in the data transmission system controlling the device using an IR remote control commander or a wired remote controller to realize more variegated control.

In one aspect, the present invention provides a data transmission control device including a unit as a logical assembly furnishing real functions and at least one subunit in the unit, the subunit being lower in order than the unit and being an assembly for realizing logical functions. The subunit includes at least one function block. This function block, lower in order than the subunit, is an assembly for realizing logical functions.

The data transmission control device performs control on the function block basis.

In this data transmission control device, the subunit includes a function block having a function in common with that of function blocks provided in different types of subunits.

With the data transmission control device, components having the same function can be used in common.

Moreover, the data transmission control device includes communication means for having communication with external equipments. By this communication means, communication is had between the unit, subunit or the function block of the data transmission control device and those of plural external equipments.

In the data transmission control device, according to the present invention, communication between the units, subunits and function blocks can be preformed among a plurality of the devices.

In another aspect, the present invention provides a method for transmitting data to a control device including a unit as a logical assembly furnishing real functions, at least one subunit in the unit, the subunit being lower in order than the unit and being an assembly for realizing logical functions, and at least one function block. The function block is lower in order than the subunit and is an assembly for realizing logical functions. The data transmitting method includes a step for transmitting a control command for controlling the function block or data representing a command of the response of the status of the function block.

In the present data transmission method, the control device can be controlled on the function block basis.

In the present data transmission method, there is included in the data the information for specifying one of the plural function blocks of the same type housed in one subunit.

In the present data transmission method, control commands controlling the portions having the same function can be used in common.

In the data transmission control device, according to the present invention, there is housed in a unit, as a unit providing real functions, at least one subunit, as a unit for realizing the functions of the lower order than those of the unit. Also, there is housed in the subunit at least one function block, as a unit for realizing the functions of the lower order than those of the subunit.

Therefore, in the data transmission control device, according to the present invention, there is no necessity of issuing control commands, having the vast information for performing variegated control for the subunit, it being possible to perform control on the function block basis, thus enabling fine control and relieving the load otherwise imposed in transmitting the control command.

Also, the subunit includes a function block having a function in common with that of function blocks provided in different types of subunits.

Thus, with the data transmission control device, according to the present invention, the components having the same function can be used in common, thus realizing a low cost. Also, since the control command for controlling the subunits and the function blocks can be used in common, software can be developed with ease while commercial designing cost can be lowered.

The data transmission control device according to the present invention includes communication means for having communication with the external equipment, such that, by this communication means, communication may be had between the unit, subunit or the function block of the data transmission control device and those of plural external equipments.

Therefore, in the data transmission control device, according to the present invention, in which communication can be had between the units, subunits and the function blocks of the plural data transmission control devices, the entire units or the entire subunits can be controlled or adjusted, while fine control may be realized on the function block basis.

In the method according to the present invention for transmitting data to a control device including a unit as a logical assembly furnishing real functions, at least one subunit in the unit, the subunit being lower in order than the unit and being an assembly for realizing logical functions, and at least one function block, the function block being lower in order than the subunit and being an assembly for realizing logical functions, a control command for controlling the function block or data representing a command of the response of the status of the function block is transmitted to the control device.

Thus, in the data transmitting method of the present invention, the control device can be controlled finely on the function block basis, without the necessity of affording a control command of the voluminous information for performing variegated control on the subunit, thus reducing the load otherwise imposed on command transmission.

Also, in the data transmitting method according to the present invention, there is contained in the data the information for specifying a pre-set one of plural function blocks of the same type housed in one subunit.

Thus, with the data transmission control method, according to the present invention, since the control command for controlling the subunits and the function blocks can be used in common, software can be developed with ease, while commercial designing cost can be lowered.

BRIEF DESCRIPTION OF THE DRAWINGS

FIG. 8 illustrates the position, name and the operation of the main CSR.

FIG. 17 shows an illustrative format of the control protocol used in the data transmission system and an illustrative command transmitted to the function block.

DESCRIPTION OF THE PREFERRED EMBODIMENTS

Figure 1A:
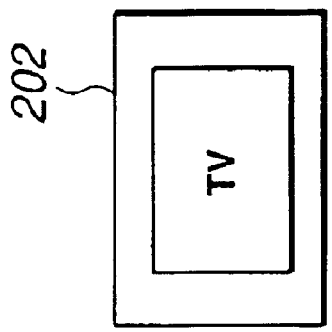
FIG. 1 shows an illustrative structure of a conventional data transmission system.
Figure 1B:
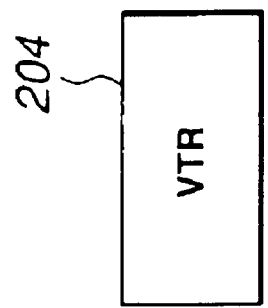
Figure 2:
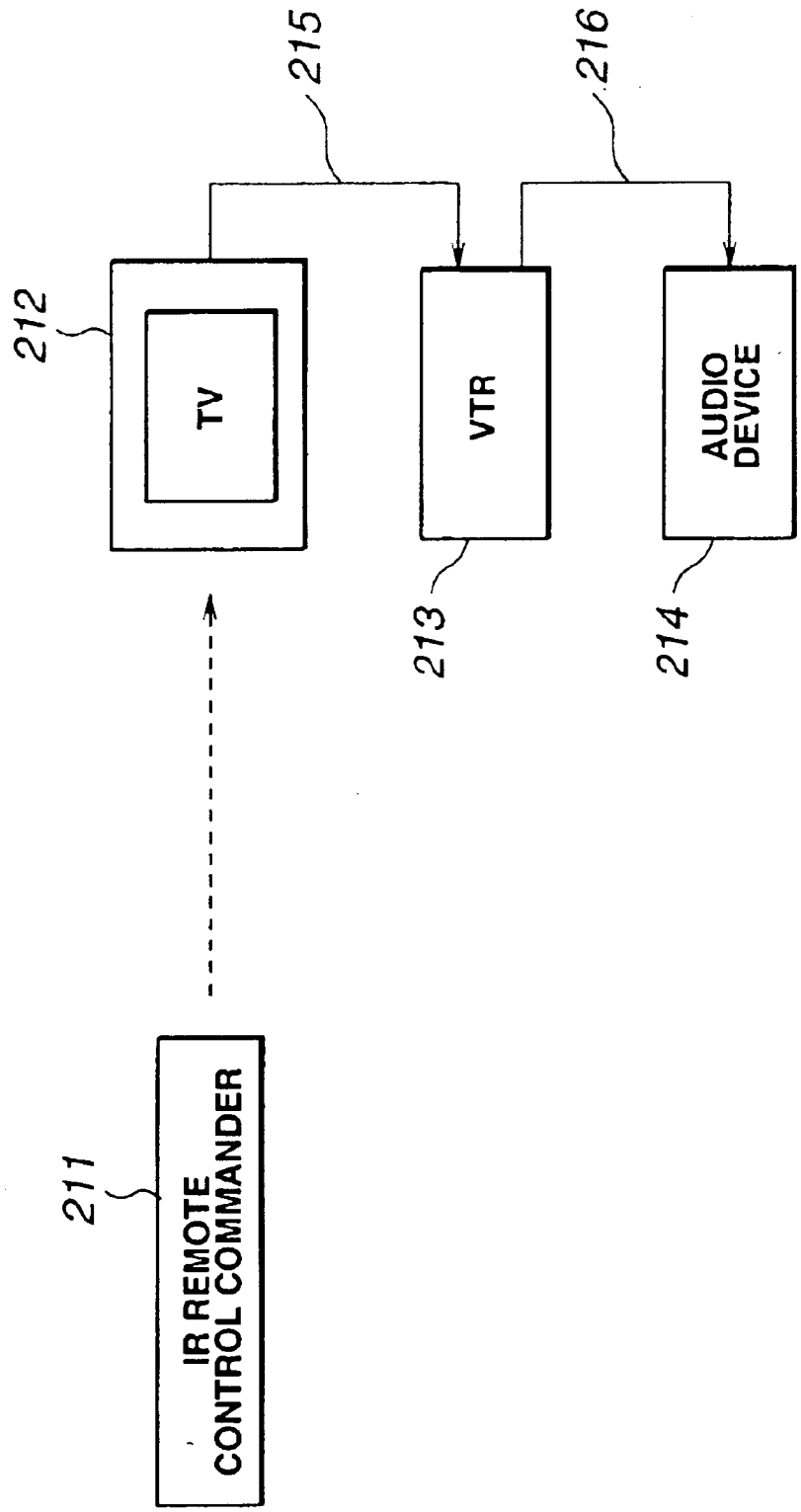
FIG. 2 shows another illustrative structure of the conventional data transmission system.

Referring to the drawings, preferred embodiments of the present invention will be explained in detail.

The embodiments, now explained, are directed to a data transmission system employing data transmission control devices according to the present invention. Specifically, these embodiments apply the data transmission control devices to a data transmission system constructed using the IEEE 1394 high performance serial bus, referred to below as the IEEE 1394 serial bus. This data transmission system is made up of a unit logically representing an assembly of physically existing equipments, sub-units representing a lower order concept of the unit and which represent an assembly configured for realizing logical functions of the equipments. The unit and the subunit represent concepts which comprise the physical hardware and the software of the equipments. The function block can also be constructed solely by the software, such as programs. Meanwhile, this data transmission system establishes signal connection between respective units, respective sub-units and respective functional blocks, as later explained, under the concept of a logical plug. The concept of the logical plug, explained towards the end of the present description, is basically omitted in the next following description.

Figure 3:
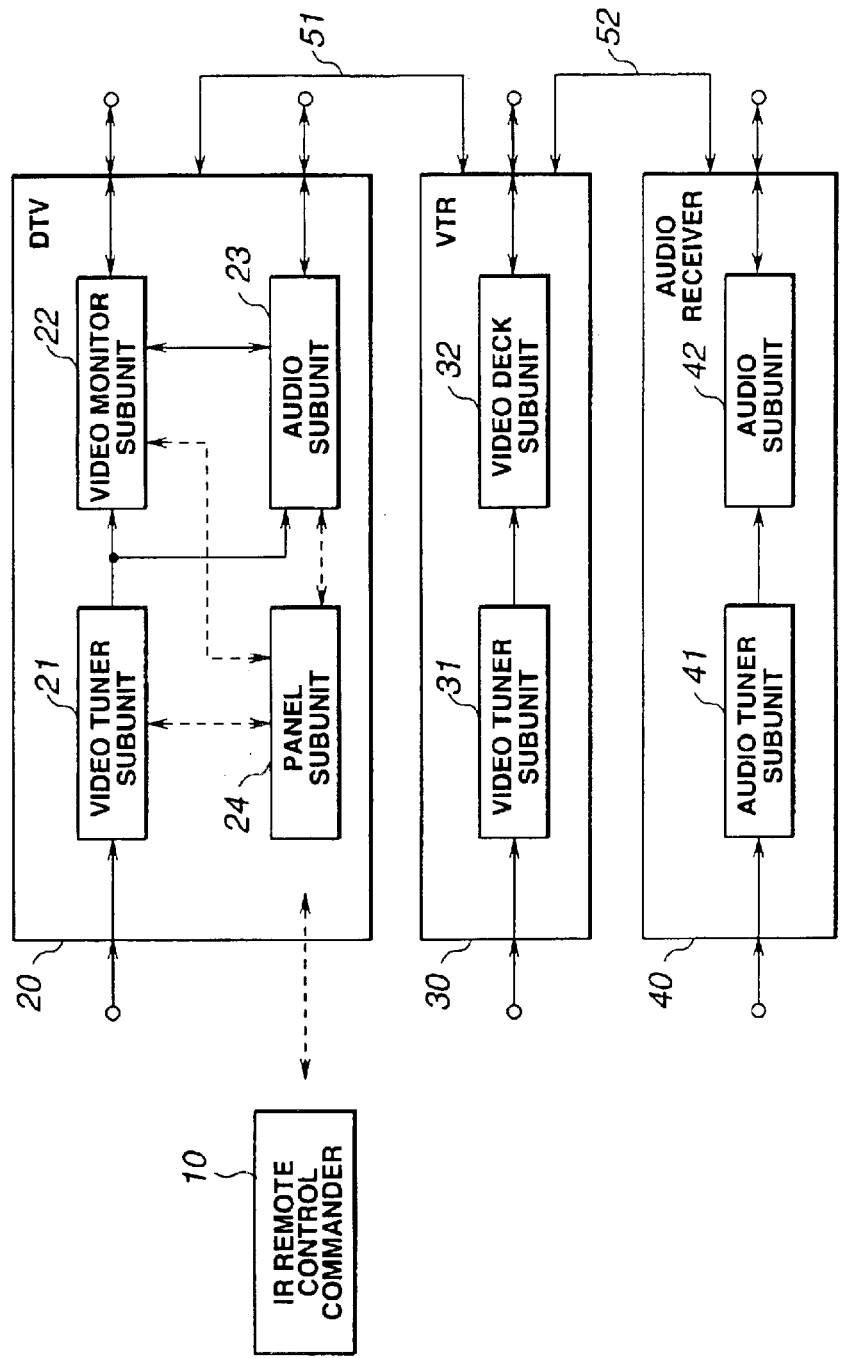
FIG. 3 shows an illustrative structure of a data transmission system according to a first embodiment of the present invention.

The data transmission system, shown in FIG. 3, includes a digital television receiver (DTV) 20, a video tape recorder (VTR) 30 and an audio receiver 40. The DTV 20, VTR 30 and the audio receiver 40 here are each constituted by a single unit.

In the DTV 20, there are housed a video tuner sub-unit 21, a video monitor sub-unit 22, an audio sub-unit 23 and a panel sub-unit 24. Each sub-unit accepts a control command from an IR remote control commander 10 so as to be controlled by this command. Although no display monitor is shown in the DTV 20 in FIG. 3, it is assumed in the following description that this display monitor is housed in the DTV 20 in the drawing. Here, the display monitor is not controlled by the control command and hence is not grasped as a sub-unit. Within the VTR 30 are housed a video tuner subunit 31 and a video deck sub-unit 32. Within the audio receiver 40 are housed an audio tuner sub-unit 41 and an audio sub-unit 42. In this data transmission system, the DTV 20, VTR 30 and the audio receiver 40 are interconnected over IEEE 1394 serial buses 51, 52.

The data transmission system, configured as described above, is controlled by the IR remote control commander 10. That is, in this data transmission system, the IR remote control commander 10 transmits a control signal to the DTV 20. The panel sub-unit 24 deciphers the IR remote control command to convert the command into control commands of a pre-set format to transfer the converted command to the video tuner sub-unit 21, video monitor sub-unit 22 and to the audio sub-unit 23. These converted commands are configured to control the sub-units 21 to 23. On the other hand, these sub-units 21 to 23 report the statuses of these equipments to the panel subunit 24 by pre-set status commands. The resulting status information is displayed on a display monitor of the DTV 20. If the IR remote control commander 10 performs bidirectional communication, the status information is demonstrated on a display, not shown.

Moreover, the IR remote control commands are converted into the asynchronous mode transmission format of the IEEE 1394 serial bus and transmitted from the DTV 20 over the IEEE 1394 serial buses 51, 52 to the VTR 30 and to the audio receiver 40. The status information of the video tuner sub-unit 31 and the video deck sub-unit 32, housed in the VTR 30, and the status information of the audio tuner sub-unit 41 and the audio sub-unit 42, housed in the audio receiver 40, are reported over the IEEE 1394 serial buses 51, 52 to the panel sub-unit 24 so as to be displayed on the display monitor of the DIV 20. If the IR remote control commander 10 performs bidirectional communication, the status information is transmitted to the IR remote control commander 10 so as to be demonstrated on a display, not shown, of the IR remote control commander 10 for confirmation.

In the above-described data transmission system, common functions may be afforded to the video tuner sub-units 21, 31 housed in the DTV 20 and in the VTR 30 and to the audio tuner sub-unit 41 housed in the audio receiver 40. Similarly, common functions may be afforded to the audio sub-units 23, 42 housed in the DIV 20 and in the audio receiver 40. Thus, in the data transmission system, low costs can be realized by using common parts or components. Moreover, in this data transmission system, control commands for controlling these sub-units can be used in common, thus assuring facilitated software development of the respective units and low cost in designing commercial products.

Meanwhile, in the above-described data transmission system, function blocks, not shown, are housed within the sub-unit to give control commands to this functional block, thus assuring finer control than is possible in a system constituted by the subunits.

Figure 4:
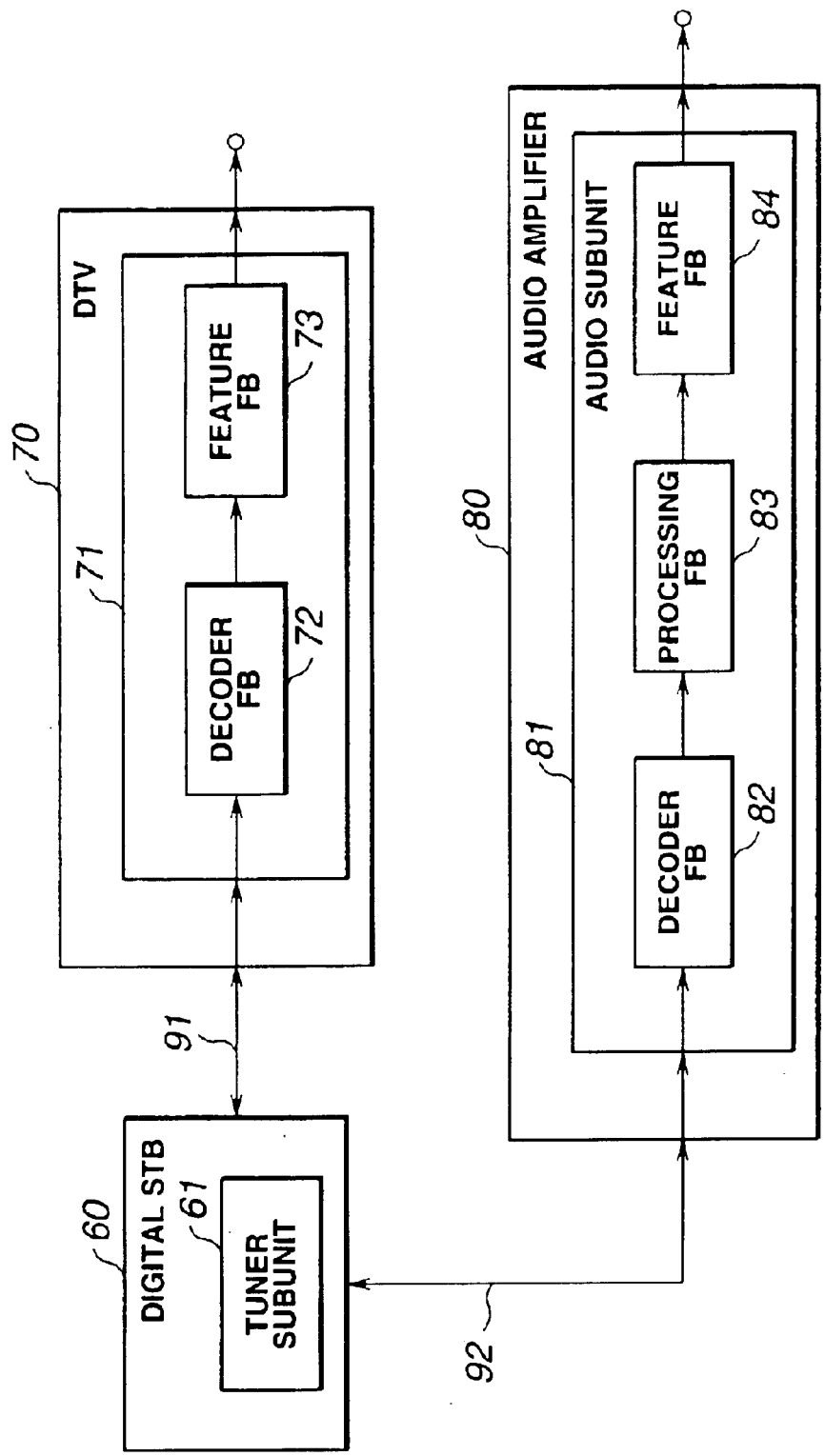
FIG. 4 shows an illustrative structure of a data transmission system according to a second embodiment of the present invention.

A second embodiment of the present invention is now explained. The data transmission system of the preferred embodiment, shown in FIG. 4, includes a digital set top box (digital STB) 60, a DTV 70, not housing a tuner subunit, and an audio amplifier 80. The digital STB 60, DTV 70 and the audio amplifier 80 here are configured as respective separate units. Meanwhile, in this data transmission system, a display monitor, not shown, is housed in the DTV 70.

In the digital STB 60 is housed a tuner sub-unit 61. In the DTV 70 is housed a video monitor sub-unit 71. In the video monitor sub-unit 71 are also housed a decoder function block 72 and a feature function block 73. In the drawing, FB denotes a function block. Meanwhile, the display monitor does not fall under the function block, for the same reason as mentioned hereinabove. In the audio amplifier 80 is housed an audio sub-unit 81 within which there are housed a decoder function block 82, a processing function block 82 and a feature function block 84. In this data transmission system, the digital STB 60, DTV 70 and the audio amplifier 80 are interconnected over IEEE 1394 serial buses 91, 92.

In the above-described data transmission system, common functions may be afforded to the decoder function block 72 and the feature function block 73, housed in the video monitor sub-unit 71 of the DTV 70, on one hand, and to the decoder function block 82 and the feature function block 84, housed in the audio sub-unit 81 of the audio amplifier 80, on the other hand. Thus, in the data transmission system, low costs can be realized by using common parts or components. Moreover, in this data transmission system, control commands for controlling these sub-units can be used in common, thus assuring facilitated software development of the respective units and low cost in designing commercial products. Moreover, in this data transmission system, since control can be performed on the function block basis, there is no necessity of sending control commands having the voluminous information for performing variegated control on the sub-units, thus assuring fine control to relieve the load in transmitting the control commands.

Figure 5:
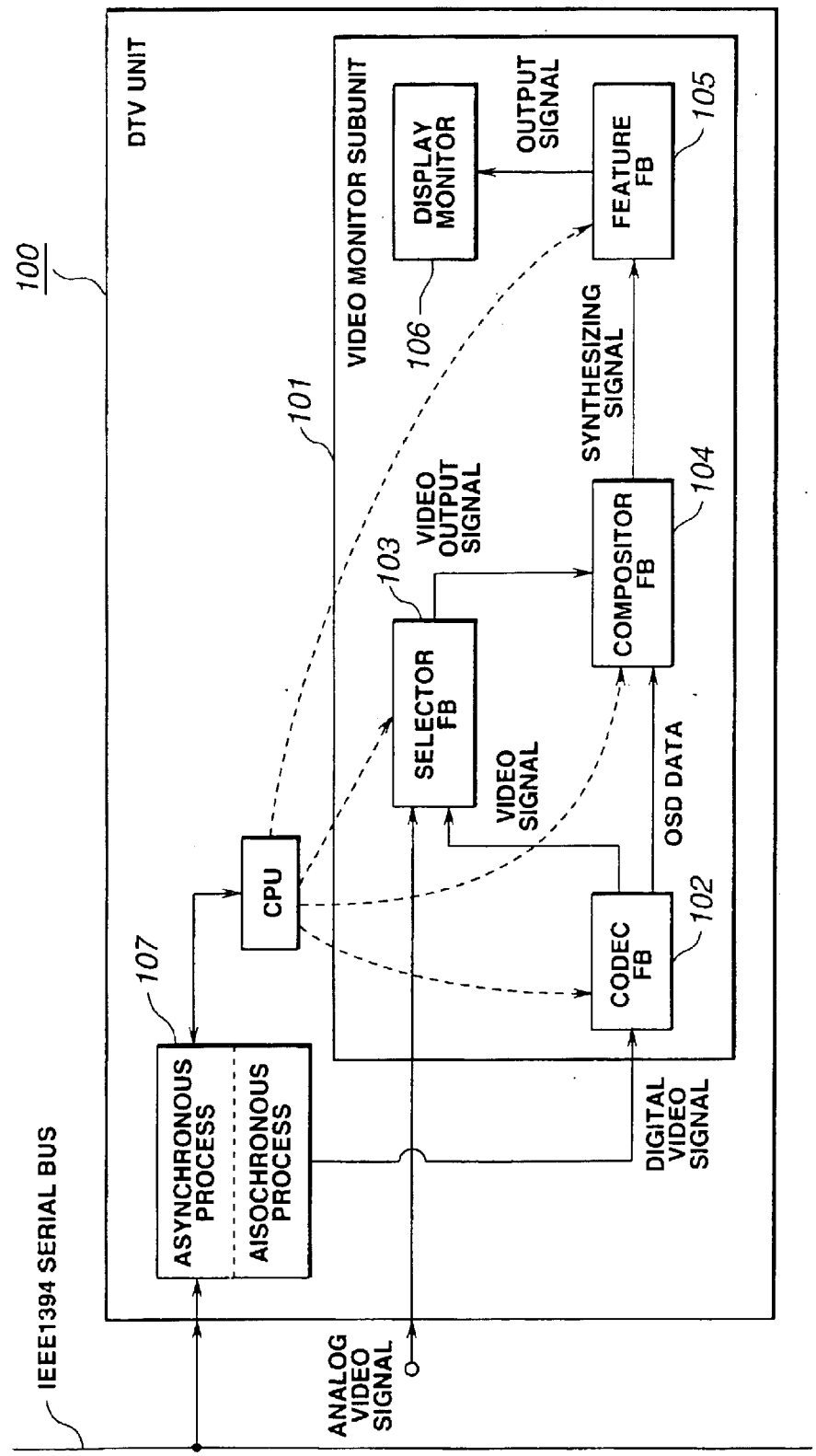
FIG. 5 shows an illustrative structure of a digital television receiver (DTV) unit in the data transmission system.
Figure 6:
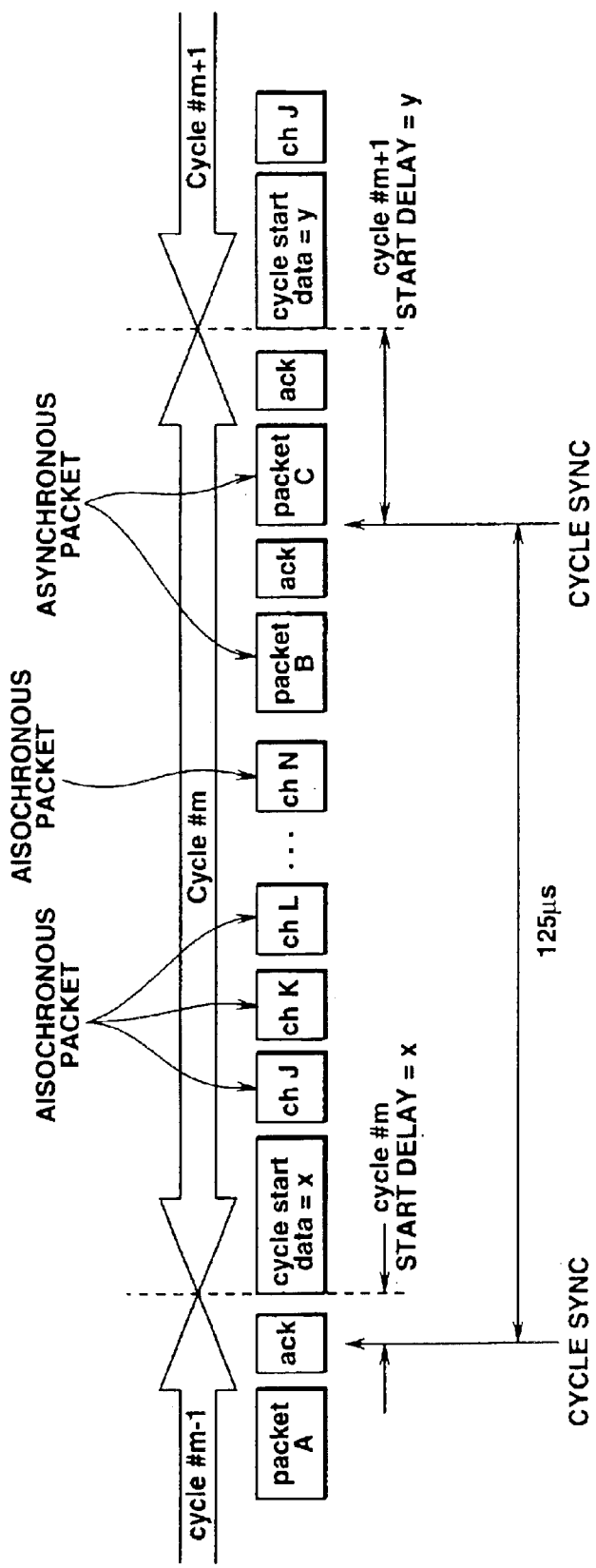
FIG. 6 shows the cyclic structure of data transmission of an equipment connected by IEEE 1394.

Referring to FIGS. 5 and 6, the DTV and audio amplifier units in the present data transmission system are explained in further detail. In the following explanation, it is assumed that the unit equivalent to the DTV 70 is a DTV unit 100 and a unit equivalent to the audio amplifier 80 is an AV amplifier unit 110.

Referring to FIG. 5, a DTV unit 100 includes an IEEE 1394 interface, as communication means, having an asynchronous process and an asynchronous process for performing asynchronous transmission mode and an asynchronous transmission mode on the data transmitted by IEEE 1394 serial bus, under control by a CPU (central processing unit). The asynchronous transmission mode is such a mode used in transmitting information signals every pre-set communication cycle, such as 125 µs, and is used when transmitting information signals, such as digital video signals or digital audio signals, in real-time. The asynchronous transmission mode is such a mode used in non-periodically transmitting connection control commands or equipment operation control command to respective function blocks. That is, in the DTV unit 100, the respective function blocks are controlled by the CPU.

Referring to FIGS. 6 to 10, the IEEE 1394 is explained in further detail.

FIG. 6 shows a cyclic structure of data transmission of equipments connected via IEEE 1394. In IEEE 1394, data is divided into packets and time-divisionally transmitted, with a cycle of the length of 125 μs as reference. This cycle is produced by a cycle start signal supplied from a node having a cycle master function. In an aisochronous packet, a band required for transmission is procured from the leading end of each cycle. The band is so termed although it is on the time basis. Thus, in aisochronous transmission, data transmission in a pre-set time is assured. However, if a transmission error has occurred, data is lost, because there is no data protection system. The node which has acquired a bus as a result of arbitration sends an asynchronous packet during the time not used for aisochronous transfer of each cycle. In the asynchronous transmission, positive transmission is assured by employing acknowledge and retry. However, the transmission timing is not constant.

In order for a pre-set node to perform aisochronous transmission, the node has to cope with the aisochronous function. Also, at least one of the nodes associated with the aisochronous function needs to be provided with the cycle master function. Moreover, at least one of the nodes connected to the IEEE 1394 serial buses 9-1 to 9-4 needs to be provided with the function of an aisochronous resource manager.

Figure 7:
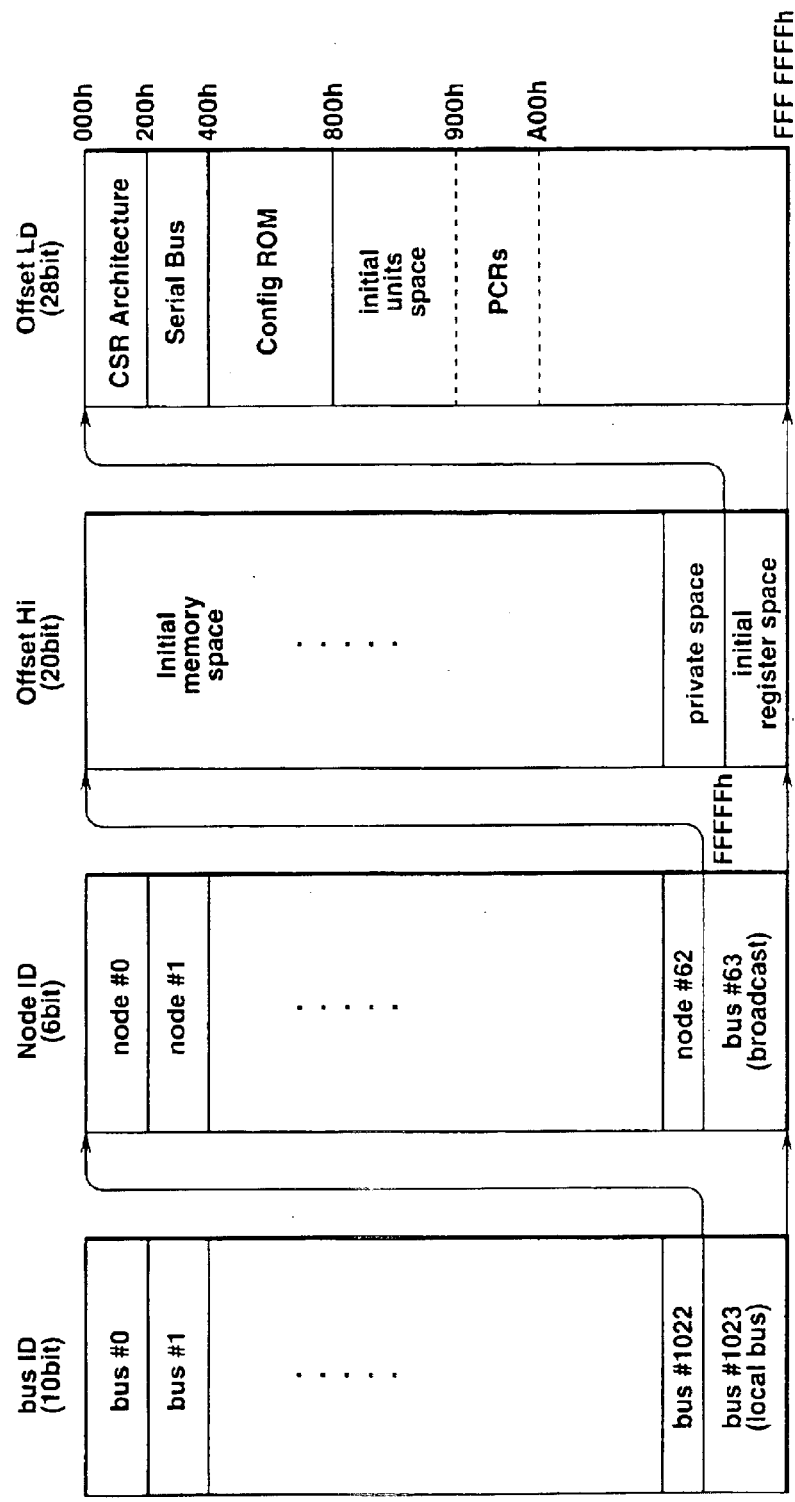
FIG. 7 illustrates the structure of an address space of the CSR architecture.

The IEEE 1394 conforms to the CSR (Control&Status Register) architecture having a 64-bit address space prescribed in ISO/IEC13213. FIG. 7 illustrates the structure of an address space of the CSR architecture. The upper 16 bits are node ID showing a node on each IEEE 1394, with the remaining 48 bits being used for designating the address space accorded to each node. The upper 16 bits are divided into 10 bits of the bus ID and 6 bits of the physical ID (node ID in the narrow sense). The value of all "1" is used for a special purpose, so that 1023 buses and 63 nodes can be specified.

In a 256 terabyte address space, defined by lower 48 bits, the space prescribed by upper 20 bits is divided into an initial register space, a private space and an initial memory space, used for a 2048 byte register proper to CSR or a register proper to the IEEE 1394. If the space prescribed by the upper 20 bits is an initial register space, the space prescribed by lower 28 bits is used as an initial unit space or as plug control registers (PCRs) used for configuration ROM (read-only memory) and for node-peculiar application.

FIG. 8 illustrates the offset address, name and the operation of main CSRS. The offset in FIG. 8 indicates an offset address as from and address FFFFF000000h at which begins the initial register space. The number sequence having h at the trailing end indicates hexadecimal notation. A bandwidth available register, having an offset of 220h, indicates a band that can be allocated to aisochronous communication. Only a value of a node operating as an aisochronous resource manager is retained to be valid. That is, although CSR of FIG. 7 is owned by each node, only the bandwidth available register owned by the aisochronous resource manager is retained to be valid. Stated differently, the bandwidth available register is owned solely by the aisochronous resource manager. If no band is allocated to the aisochronous communication, a maximum value is held in the bandwidth available register, whilst the value is decremented each time a band is allocated to the aisochronous communication.

Each bit of a channel available register, with an offset of 224h to 228h, is associated with each of channel numbers of from 0 to 63. The bit 0 indicates that the channel has already been allocated. Only the channel available register of a node operating as an aisochronous resource manager is valid.

Figure 9:
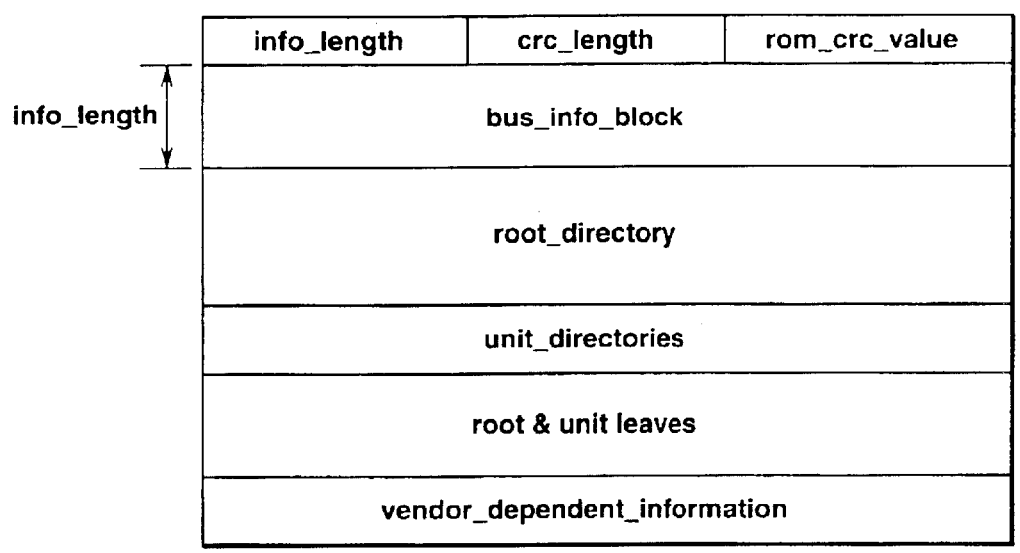
FIG. 9 illustrates the general ROM format.

Returning to FIG. 7, a configuration ROM which is based on a general ROM (read-only memory) format, is arranged in addresses 200h to 400h in the initial register space. FIG. 9 shows the general ROM format. Each node, as an accessing unit on the IEEE 1394, is able to have plural units operating independently of one another, as the units use the address space in the node in common. The unit directories (unit_directories) can indicate the version or the position of the software with respect to the unit. Although the positions of the bus information block bus_info_block and the root directory root_directory are fixed, the positions of the other blocks can be specified by offset addresses.

Figure 10:
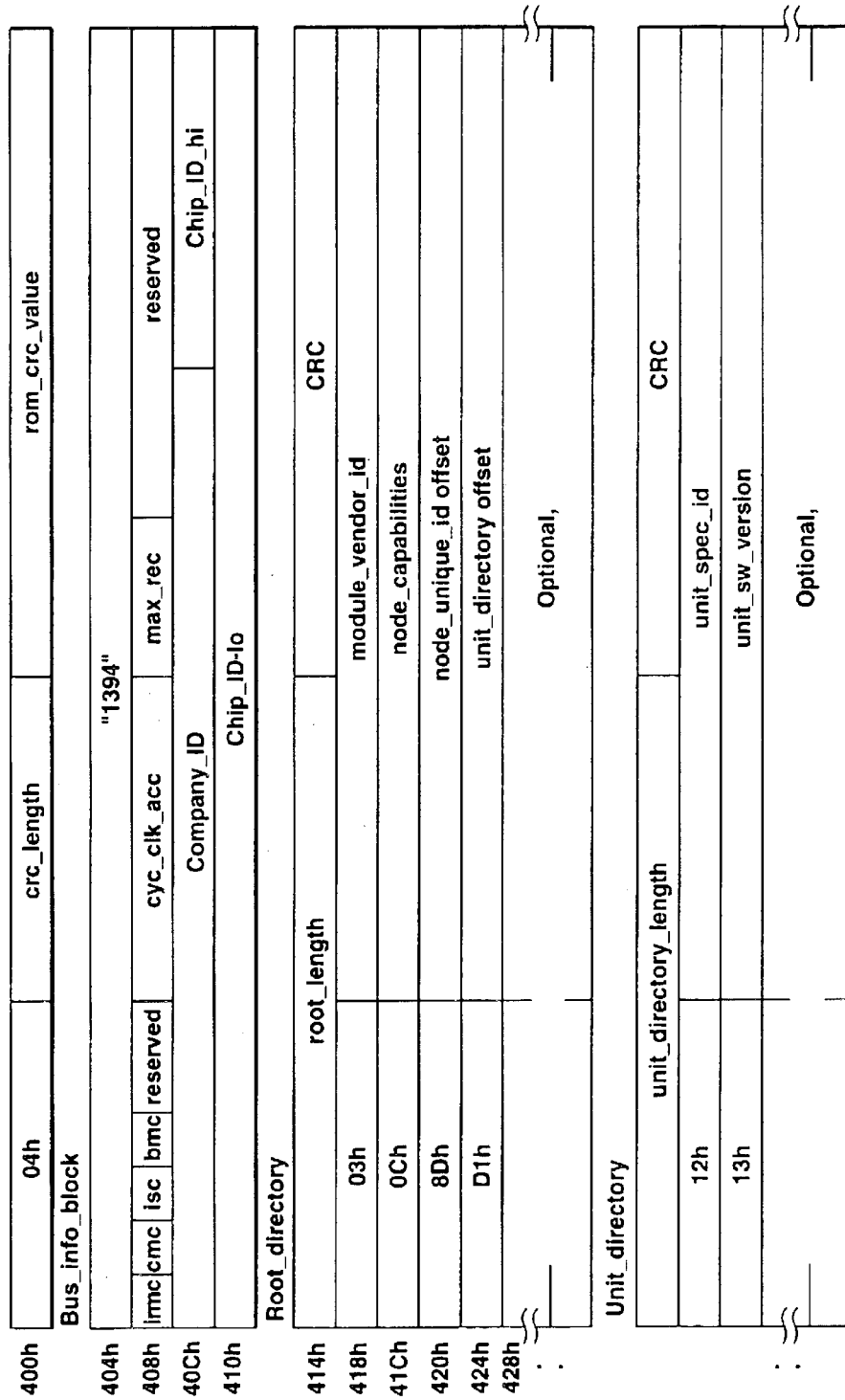
FIG. 10 shows details of a bus information block, a root directory and a unit directory.

FIG. 10 shows details of the bus information block bus_info_block, root directory root_directory and the unit directory unit_directory. In the Company_ID in the bus_info_block are stored ID numbers indicating the manufacturer of the equipment. In the Chip_ID is stored a sole ID in the world, proper to the equipment, and which is not overlapping with other equipments. In a unit_spec_ID of the unit_directory of an equipment satisfying IEC 1883, 00h, A0h and 2Dh are written in a first octet, second octet and in a third octet, under the IEEE 1394 standard, are written, respectively. In a first octet and in the LSB (least significant bit) of a third octet of the unit switch version (unit_switch_version) are written 01h and 1, respectively.

Returning to FIG. 5, a video monitor sub-unit 101 and a display monitor 106 are enclosed in the DTV unit 100. The video monitor subunit 101 has enclosed therein a CODEC function block 102, a selection function block 103, a compositor function block 104 and a feature function block 105. The digital video signal, inputted to the DTV unit 100 via the IEEE 1394 interface, is decoded in the CODEC function block 102 into video signals and on-screen display data, referred to below as OSD data. The decoded video signals are inputted to the selection function block 103. The OSD data are inputted to the compositor function block 104. The analog video signals are inputted to the selection function block 103. The analog video signals and the video signals decoded at the CODEC function block 102 are subjected to selection by the selection function block 103. The video output signal, resulting from this selection, is inputted to the compositor function block 104. The video output signals and the OSD data are synthesized in the compositor function block 104. The resulting % synthesis signal is inputted to the feature function block 105. The synthesis signal is adjusted in the feature function block 105 as to the lightness of the picture or the color mixing for a color picture and is outputted as an output signal to the display monitor 106.

Figure 11:
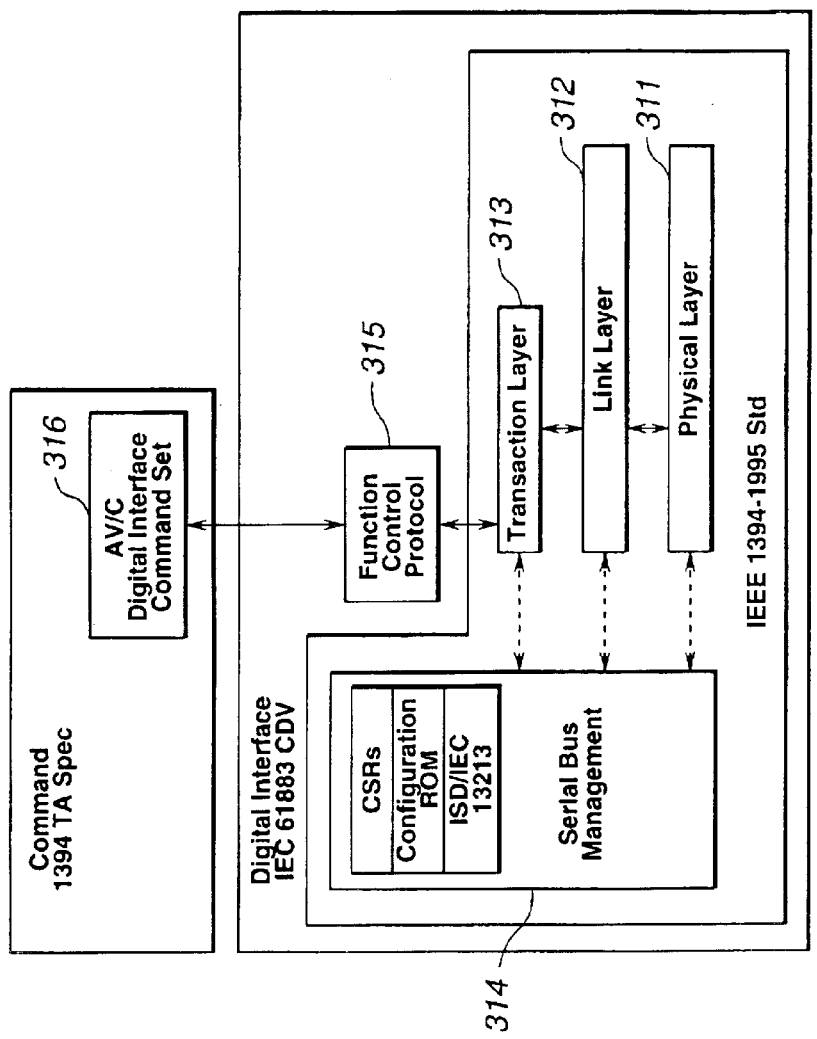
FIG. 11 illustrates a stack model of the IEEE interface of FIG. 5.
Figure 12:
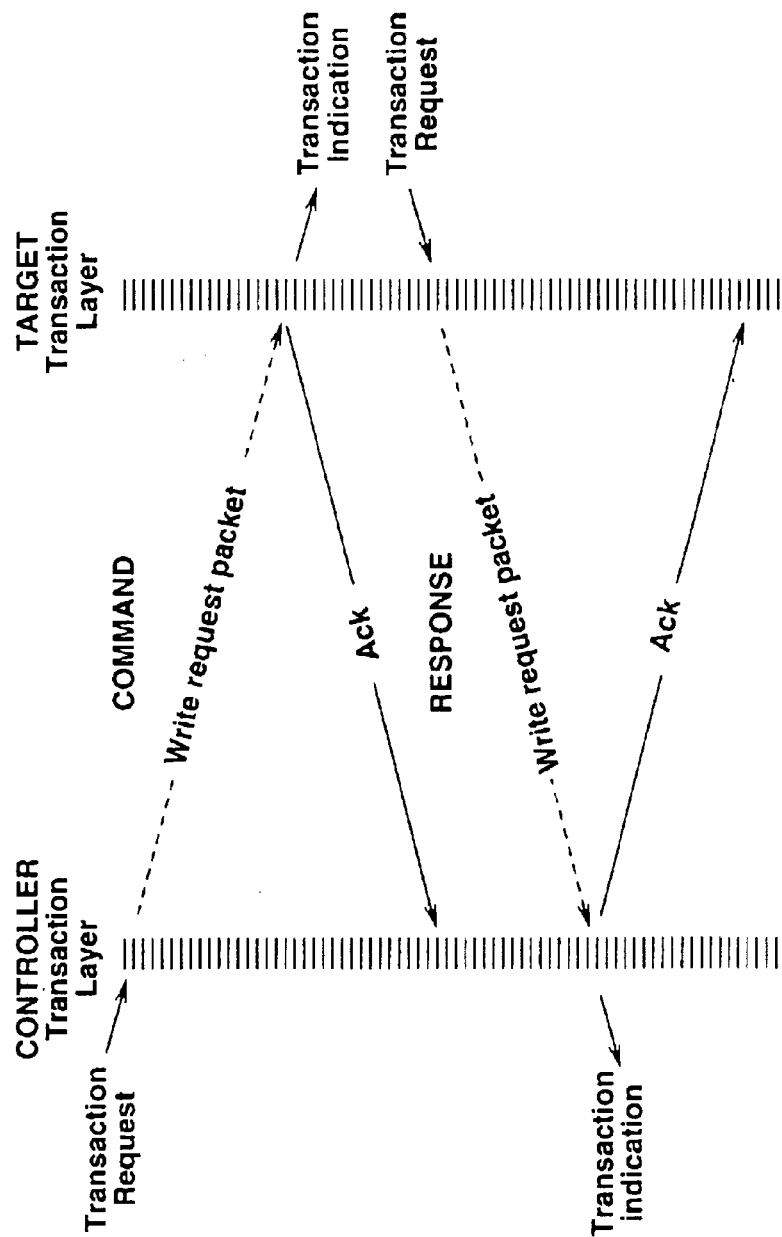
FIG. 12 illustrates the relation between the command and the response of the FCP.
Figure 13:
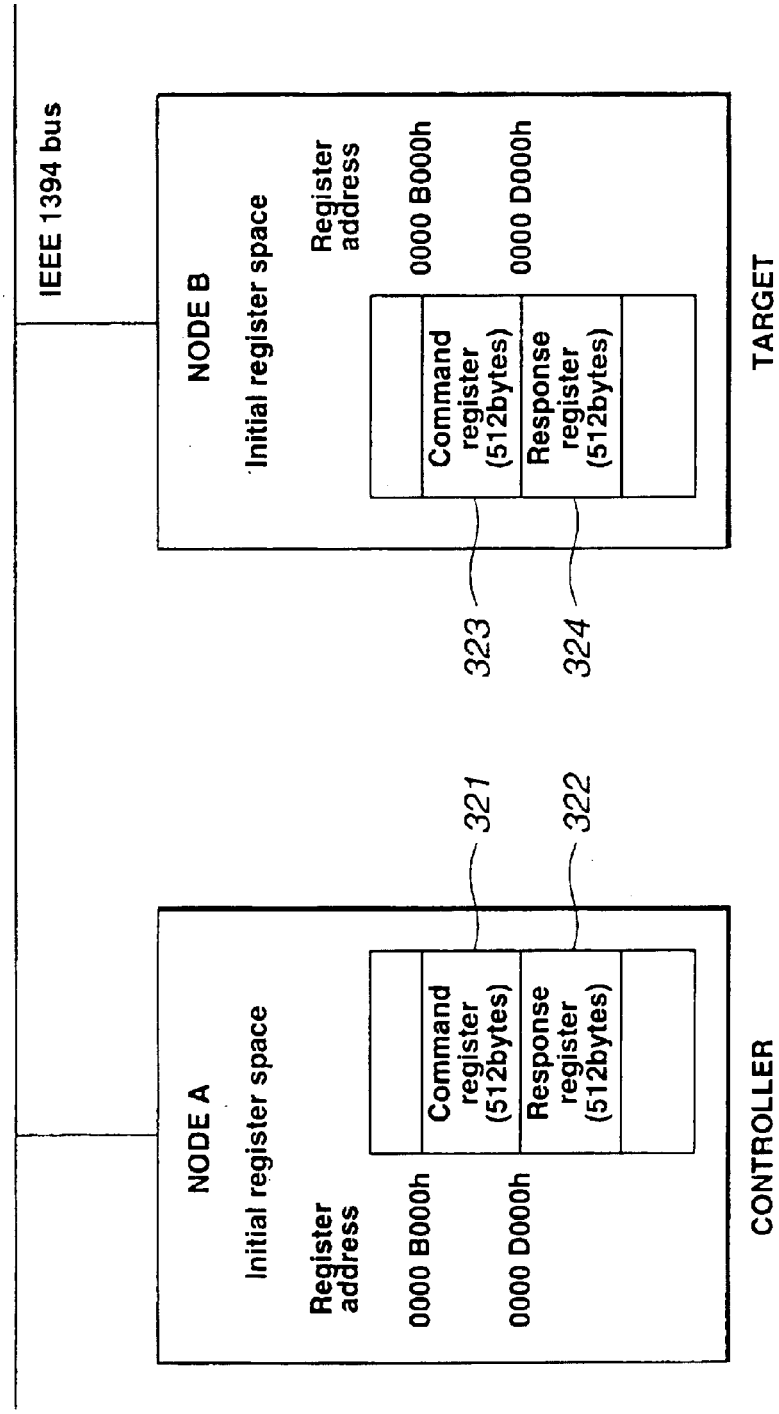
FIG. 13 illustrates the relation between the command and the response in further detail.

Referring to FIGS. 11 to 13, an IEEE 1394 interface 107 is explained. FIG. 11 shows a stack model of the IEEE 1394 interface 107. In FIG. 11, a physical layer 311, a link layer 312, a transaction layer 313 and a serial bus management 314 conform to IEEE 1394. A FCP (function control protocol) 115 conforms to IEC61883. A FCP (function control protocol) 115 conforms to IEC61883. An AV/C command set 316 conforms to 1394TA specifications.

FIG. 12 illustrates commands and responses of FCP315. The FCP is a protocol for controlling the AV equipments on the IEEE 1394. As shown in FIG. 12, the controlling side is a controller and a controlled side is a target. The FCP command transmission or response is carried out between nodes using a write transaction of the IEEE 1394 asynchronous communication. The target which has received data returns acknowledge to the controller for reception confirmation.

FIG. 13 illustrates the relation between the FCP command and response shown in FIG. 12 in greater detail. A node equipment A and a node equipment B are interconnected over the IEEE 1394 bus. The node equipment A is a controller A and the node equipment B is a target. A command register and a response register, each of 512 bytes, are provided for each of the nodes A and B. As shown in FIG. 13, the controller gives a command by writing a command message in a command register 324 of the target. Conversely, the target gives a response by writing a response message in a response register 322 of the controller. These two messages are paired to exchange the control information. The format of the control protocol, sent by FCP, will be explained subsequently with reference to FIG. 16.

Figure 14:
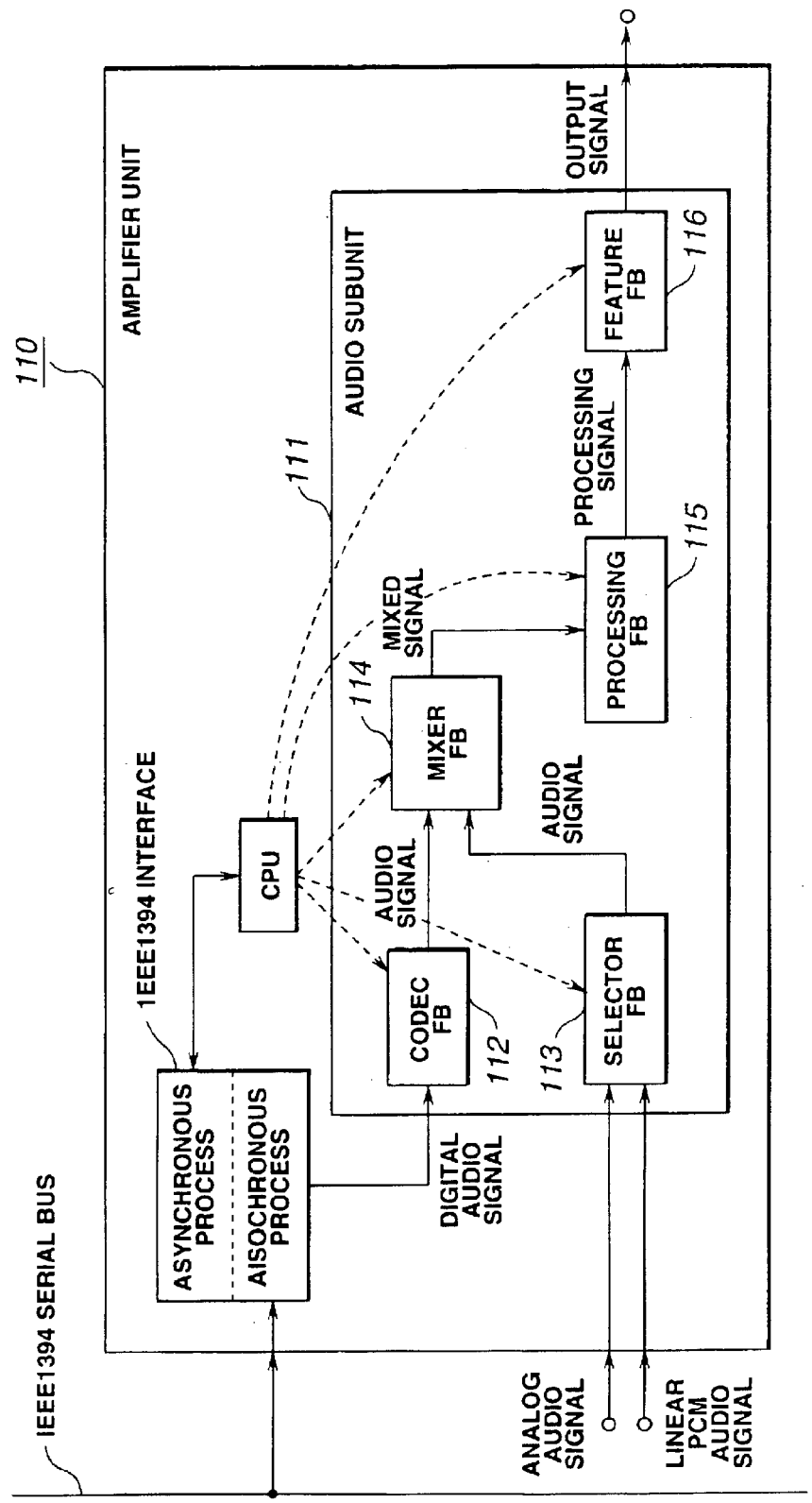
FIG. 14 shows an illustrative structure of an AV amplifier unit in the data transmission system.

The AV amplifier unit 110, shown in FIG. 14, has the respective function blocks controlled by the CPU. Similarly to the DTV unit, described above, the AV amplifier unit 110 includes an IEEE 1394 interface having an aisochronous process and an asynchronous process.

The AV amplifier unit 110 has, enclosed therein, an audio sub-unit 111, within which are enclosed a CODEC function block 112, a selection function block 113, a mixer function block 114, a processing function block 115 and a feature function block 116. The digital audio signals, inputted to the AV amplifier unit 110 via the IEEE 1394 interface, are inputted to the CODEC function block 112 so as to be decoded to audio signals. The decoded audio signals are inputted to the mixer function block 114. On the other hand, the analog audio signals or the linear PCM (pulse code modulation)+audio signals are inputted to the selection function block 113 from which selected audio signals are inputted to the mixer function block 114. These audio signals are mixed in the mixer function block 114. The mixed signals, thus obtained, are outputted to the processing function block 115, such as a Dolby Processing-Logic (registered trademark of DOLBY INC.), where the signals undergo a variety of processing operations. Output signals of the processing function block 115 are inputted to the function block 116 for adjusting the tone quantity or the sound quality, such as reverberation. The resulting signals are outputted as output signals.

Figure 15:
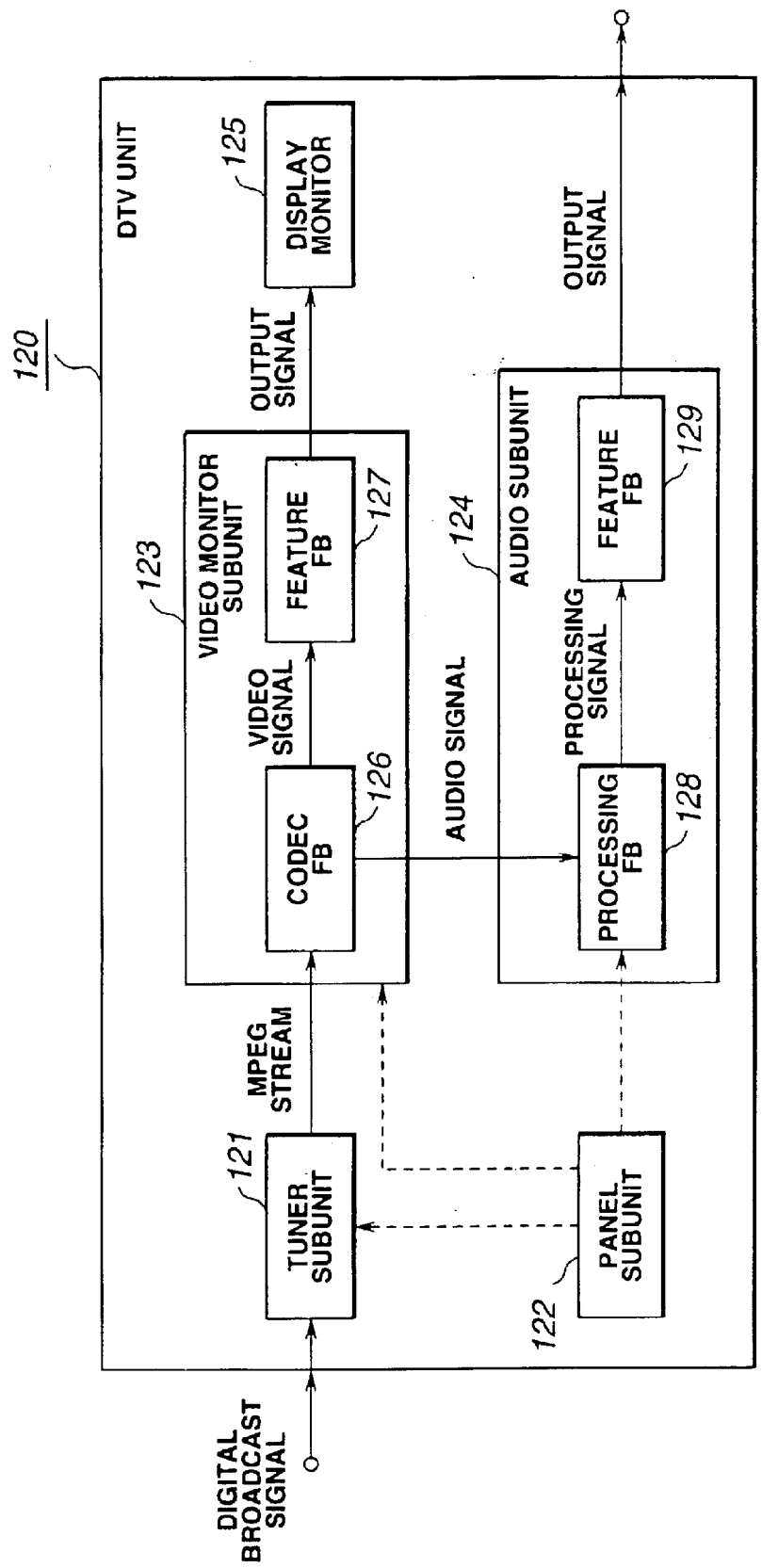
FIG. 15 shows another illustrative structure of a DTV unit in the data transmission system.

Referring to FIG. 15, a DTV unit, containing a tuner sub-unit, as an alternative structure of the above-described DTV unit 100, is explained in detail with reference to FIG. 15.

A DTV unit 120, shown in FIG. 15, includes a tuner sub-unit 121, a panel subunit 122, a video monitor sub-unit 123, an audio sub-unit 124 and a display monitor 125. Similarly to the DTV unit 100, the DTV unit 120 is configured for inputting data transmitted over the IEEE 1394 serial bus via the IEEE 1394 interface, in a manner not shown here for simplicity. That is, the DTV unit 120 is connected over the IEEE 1394 serial bus to an external unit.

The video monitor subunit 123 includes a CODEC function block 126 and a feature function block 127. The audio sub-unit 124 has enclosed therein a processing function block 128 and a feature function block 129.

In the DTV unit 120, digital broadcast signals, for example, received by the tuner sub-unit 121, are inputted to the CODEC function block 126, enclosed in the video monitor sub-unit 123, in the form of a MPEG (Moving Picture Experts Group) stream. The MPEG stream is decoded in the CODEC function block 126 into video and audio signals. The video signals are inputted to the feature function block 127 for picture quality adjustment. Output signals of the feature function block 127 are displayed on the display monitor 125. The analog or linear PCM audio signals, obtained on decoding, are inputted to a processing function block 128 where the signals undergo variegated processing. The processed signals are inputted to the feature function block 129. The processed signals are adjusted in sound quality and outputted as output signals to a speaker system, not shown, enclosed in the DTV unit 120, or to an outside speaker system, not shown.

In the data transmission system, made up of the above-mentioned units, subunits and function blocks, the control protocol used for transmitting the control command in the asynchronous transmission mode of the IEEE 1394 serial bus and for receiving the status response is explained with reference to FIG. 16.

Figure 16:
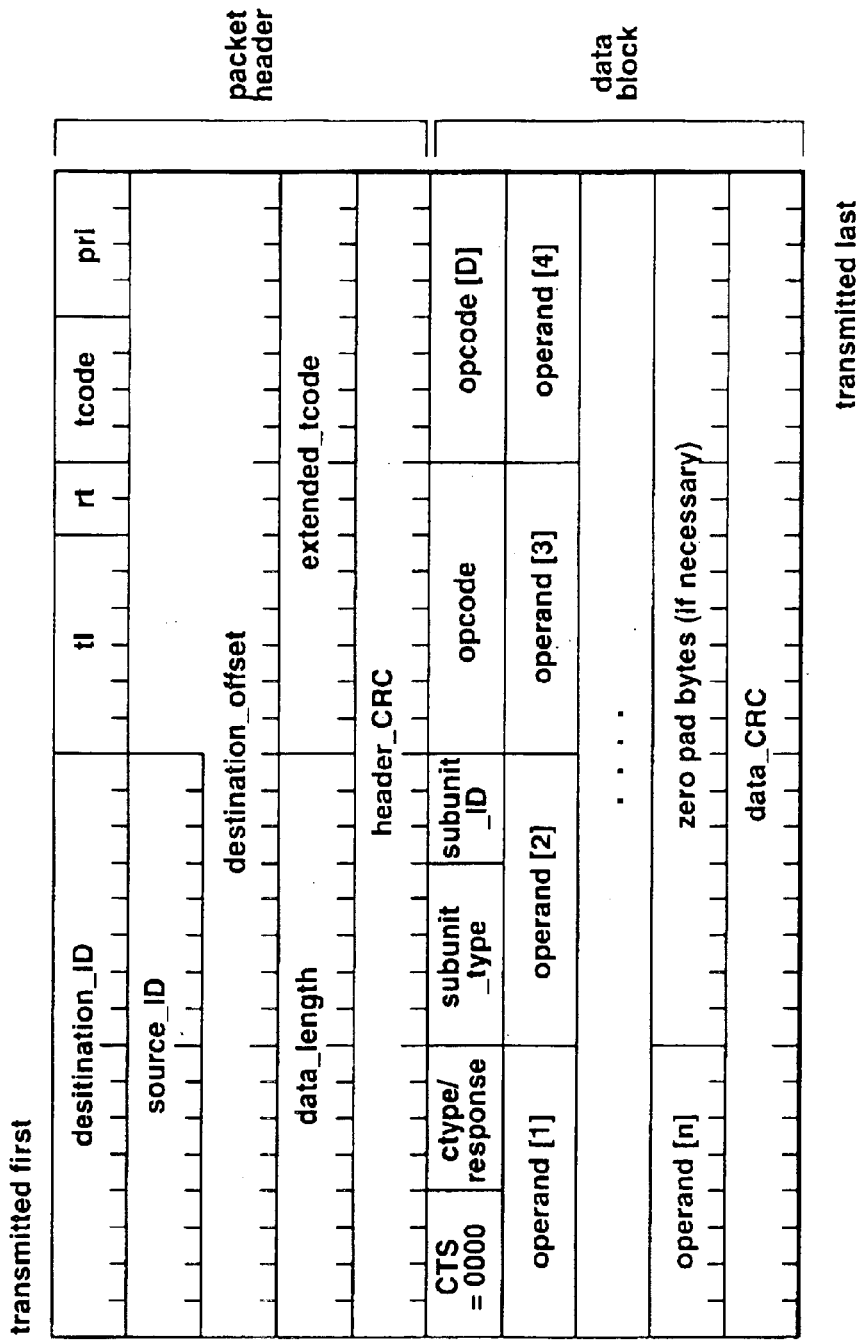
FIG. 16 shows an illustrative format of the control protocol used in the data transmission system.

In the format of the control protocol 1 quadlet=32 bits are used as a unit, as shown in FIG. 16. The first five quadlets represent a packet header. If the entire format is regarded as a packet, the last quadlet is the data CRC (cyclic redundancy check). These six quadlets represent the basic structure in the asynchronous transmission mode of the IEEE 1394 serial bus. In the packet header, destination ID (destination_ID) is an address of the unit of the destination of transmission, with a source ID (source_ID) being an address of the unit of the source of transmission. The seventh and the following quadlets represent a data block.

In a data block, four bits of the first CTS (command transaction set) discriminate between the control command and the status response system. For example, CTS=0000b is an AV/C (audio video/control) command set. In the following description, this AV/C command set is taken as an example. The four bits of the ctype/response represent the codes for discriminating between the control command and the status response and for prescribing the types of the control command and the status response. The five bits of the subunit type (subunit_type) indicate an address of a subunit enclosed in the unit of the destination of the transmission established by the destination ID. For example, the video subunit allocates 00000b=00h, whilst the audio sub-unit allocates 00001b=01h. The three bits of the subunit ID (subunit_ID) are used for discriminating a case of plural subunits contained in a unit. That is, if three sub-units of the same type are enclosed in a unit, the subunit_ID is useful in discriminating which one of the three subunits is at issue. An opcode (opcode) is a code of the control command and the status response. An operand (operand) is a modifier of the control command and the status response, with the required number n differing with the type of the opcodes of the control command and the status response.

In the above-described data transmission system, control commands and the status response commands, addressed to a unit or a sub-unit, are transmitted over an IEEE 1394 serial bus. For example, the commands addressed to the video monitor sub-unit 101 of the DTV unit 100 can be used for control, such as color tone control of the general lightness or color tone of a color picture, and for status response. On the other hand, the commands addressed to the audio sub-unit 111 of the AV amplifier unit 110 can be used for general sound volume adjustment, tone control or stereo left right balancing etc.

The command format for transmitting commands to the function block and for receiving the status response from the function blocks is as shown in FIG. 17.

That is, function block commands are allocated to the opcodes for indicating that the following data is a command for transmitting a command of the function block and for receiving the status response. To this opcode is allocated one of codes 00h to 0Fh, such as 04h, for indicating that the command is common to the units and the subunits. The first operand (operand[0]) is a function block type (function_block_type) and the second operand (operand[1]) is a function block ID (function_block_ID). This function block type indicates an address of the function block, whilst the function block ID is used for selecting plural function blocks of the same type in the sub-unit. The third operand (operand[2]) is a command for receiving the control command to the function block specified in the sub-opcode and the status response. The fourth operand (operand[3]) is a sub-operand (suboperand) for the sub-opcode.

In the above-described data transmission system, the control command and the status response command, addressed to the function block, are transmitted via the IEEE 1394 serial bus by the control protocol comprised of the above-described format. For example, in the above-described DTV unit 100, a control command for decoding the MPEG signals is sent to the CODEC function block 102, whilst a control command for selecting decoded video signals and one other video signals are sent to the selection function block 103. A control command is sent to video-synthesize OSD data from the CODEC function block 102 and the video output signals selected in the selection function block 103 in the compositor function block 104. Thus, the DTV unit 100, employing the control protocol, is able to perform fine adjustment of the function blocks enclosed in the video monitor sub-unit 101. In the above-described AV amplifier unit 110, the above-described control protocol may be used to perform variegated control, such as sending a control command or converting signals to a Dolby Processing-Logic signals to the processing function block 115 and sending a control command for adjusting the sound volume level of each channel of audio signals of the multiple channels to the function block 116.

In the data transmission system, constructed using the units, subunits and function blocks, interconnected via the above-mentioned IEEE 1394 serial bus, signal connection between the units, subunits and the function blocks is set under the concept of the logical plug as now explained.

Figure 18:
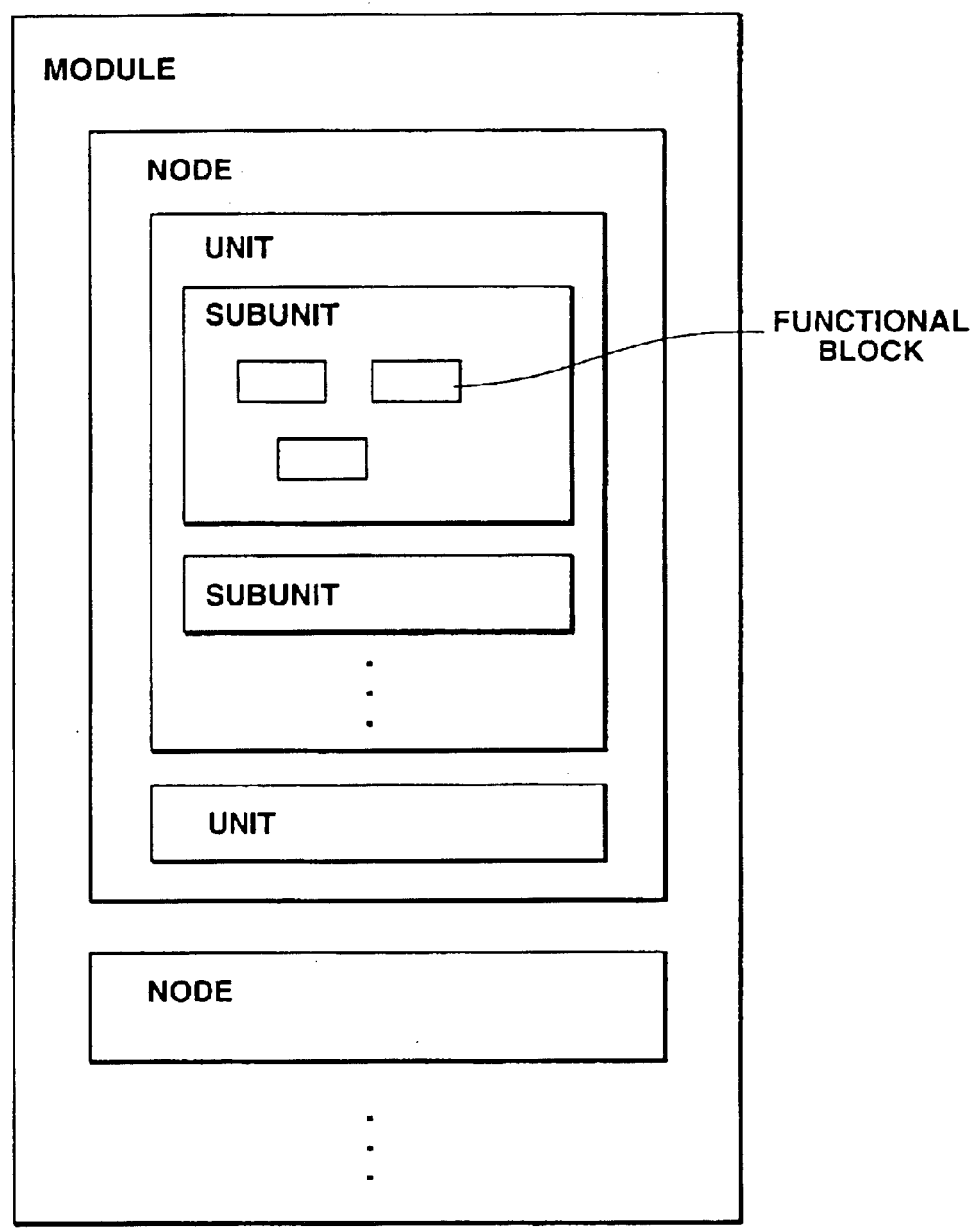
FIG. 18 illustrates the structure of a routine data transmission system employing the IEEE high performance serial bus.

The general data transmission system, employing the IEEE 1394 serial bus, is of such a structure in which, as shown in FIG. 18, nodes as logical units are contained in a module as a physical unit of an equipment, a subunit as an assembly of logical functions is contained in the unit, and in which function blocks as units of the logical functions in the subunit are contained in the subunit. Therefore, the modules, nodes and units are herein deemed to be equivalent, and a plug between a unit and the outside and a plug in the unit are explained.

Figure 19:
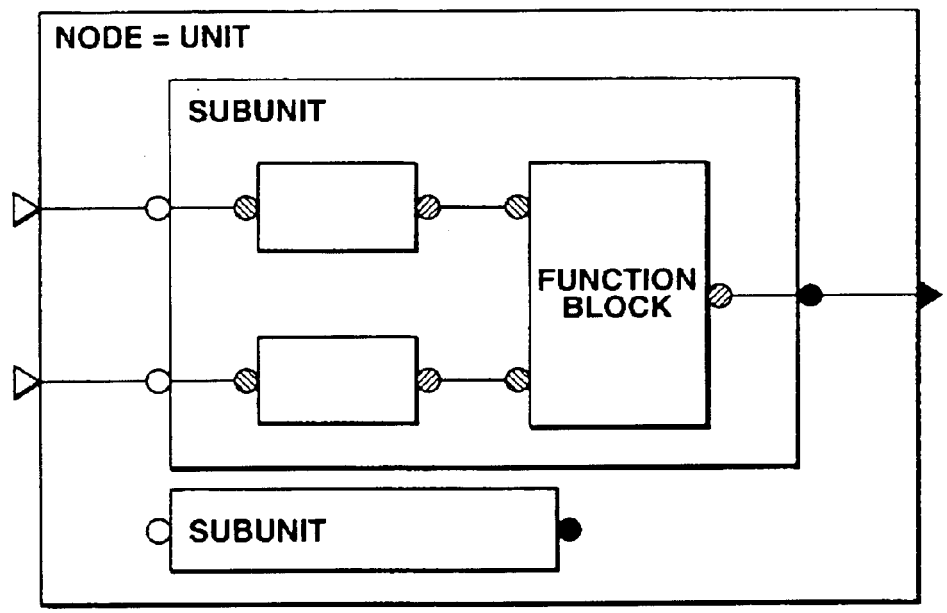
FIG. 19 illustrates the configuration of the data transmission system and specifically its logic plug.

Referring to FIG. 19, the data transmission system includes, as a logical plug, a serial bus plug, a subunit plug and a function unit plug. The serial bus plug denotes a signal inlet/outlet for the IEEE 1394 serial bus. The sub-unit plug denotes a signal inlet/outlet for a bus in the subunit and may be deemed to be a plug of the lower hierarchical layer of the serial bus plug. The function block plug denotes a signal inlet/outlet for a bus in the function block and may be deemed to be a plug of the further lower hierarchical layer of the function block. In FIG. 19, the left and right side plugs of each block denote a plug for inlet and a plug for outlet, respectively.

In this data transmission system, data transmitted over the IEEE 1394 serial bus is inputted to the serial bus plug for inlet. The data inputted to the serial bus plug is eventually pre-processed in a unit and distributed to subunit plugs for inlet of each subunit to which data is to be inputted. This establishes logical connection between the subunit and the serial bus plug of the unit. Input data to the subunit plug is eventually processed in each subunit and distributed to an input function block plug of each function block. That is, logical connection is established between the function block and the subunit plug of the subunit. The logical connection between the respective function blocks is achieved by the function block plug for output of the data outputting function block and by the function block plug for input of the function block to which data is to be inputted. When the data processed in variegated manner by each function block is to be outputted to upper order units, that is from the function block to the subunit, the data are collected on the subunit plug of the subunit for output. The output data from the subunit plug of the subunit for output are outputted to outside from the serial bus plug of the unit for output.

In the data transmission system, the unit and the subunit are logically connected to each other, while the subunit and the function block are connected to each other and respective function blocks are connected to each other to distribute the data.

In the data transmission system, as described above, in which a function block is provided as a lower hierarchical layer of the subunit, it becomes possible to use parts or commands in common, in a more meticulous fashion, while it is possible to perform fine control in data transmission.

The present invention is not limited to the above-described embodiments. For example, it is possible to use control commands other than those described above to control the respective function blocks. For example, it may be contemplated to use commands for controlling the CODEC function blocks of the AV amplifier unit which specify the signal encoding system in use, such as AC-3 (Audio Coding-3) or MPEG. Also, the commands for controlling the processing function blocks of the AV amplifier unit may be those designed to control the dynamic range or to change the mode, as in chorus, in addition to those converting the signal to the Dolby Logic signals. In addition, the commands controlling the feature function block may be AGC (automatic gain control). The present invention can otherwise be modified without departing from the scope of the invention.

What is claimed is:

1. An electronic equipment comprising:

a unit as a logical assembly furnishing real functions;

at least one subunit in said unit, said subunit being lower in order than said unit and being an assembly for realizing logical functions;

at least one function block, said function block being lower in order than said at least one subunit and being an assembly for realizing logical functions; and a receiver for receiving a control command for controlling said at least one function block or data representing a command of the response of the status of said function block, wherein said data includes information for specifying said at least one subunit having a pre-set function block.

2. The electronic equipment according to claim 1 wherein said subunit includes a function block having a function in common with that of function blocks provided in different types of subunits.

3. The electronic equipment according to claim 1 further comprising:

communication means for having communication with an external equipment, wherein communication is enabled through said communication means between said unit, subunit or the function block and a unit, a subunit or a function block of said external equipment.

4. The electronic equipment according to claim 3 wherein said function block includes:

inputting means for inputting a control command; and control means for controlling the function of said function block based on said control command, wherein said control command includes:

information specifying the type of the function block;

information specifying said function from plural function blocks of the same type; and control information specifying the type of the control command for said function block.

5. The electronic equipment according to claim 1 wherein said communication means conforms to the IEEE 1394 high performance serial bus standard.

6. The electronic equipment according to claim 1 wherein the electronic equipment is a data transmission control device for controlling data transmission.

7. An electronic equipment for sending out a control signal for controlling an external electronic equipment, said external electronic equipment including a unit as a logical assembly furnishing real functions, at least one subunit in said unit, said subunit being lower in order than said unit and being an assembly for realizing logical functions, and at least one function block, said function block being lower in order than said subunit and being an assembly for realizing logical functions; said electrical equipment comprising:

control command actuating means for specifying the type of the control command;

control command generating means for generating a control command based on actuation of said control command actuating means; and control command outputting means for outputting the generated control command to said external electronic equipment;

said control command including the information specifying the type of said function block;

the information specifying said function from plural functions of the same type; and the control information specifying the type of the control for said function block.

8. The electronic equipment according to claim 7 wherein said control command further includes the information for specifying a pre-set one of plural units; and the information for specifying a pre-set one of the plural sub-units housed in said pre-set unit.

9. A method for transmitting data to a control device including a unit as a logical assembly furnishing real functions;

at least one subunit in said unit, said subunit being lower in order than said unit and being an assembly for realizing logical functions; and at least one function block, said function block being lower in order than said subunit and being an assembly for realizing logical functions; wherein the data transmitting method includes a step for transmitting a control command for controlling said function block or data representing a command of the response of the status of said function block, wherein said data includes information for specifying said at least one subunit having a pre-set function block.

10. The data transmitting method according to claim 9 wherein said transmitting step includes a unit transmitting step for transmitting said data to said unit of said control device;

a sub-unit transmitting step for transmitting said data transmitted to said unit to said subunit; and a function block transmitting step for transmitting said data transmitted to said unit to said function block.

11. The data transmitting method according to claim 9 wherein said data includes the information specifying the type of said function block.

12. The data transmitting method according to claim 9 wherein said data includes the information for specifying one of the plural function blocks of the same type housed in one sub-unit.

13. The data transmitting method according to claim 9 wherein said data includes the unit information for specifying the unit having said subunit.

14. The data transmitting method according to claim 9 further comprising:

transmitting a control command for controlling the function block or a response command for the state of the function block.

15. The data transmitting method according to claim 9 further comprising:

transmitting data for modifying the control command for controlling the function block or data for modifying the response command for the state of said function block.

16. The data transmitting method according to claim 9 wherein said data has a format conforming to the IEEE 1394 high performance serial bus standard.

* * * * *